United States Patent
Coker

(10) Patent No.: US 7,437,502 B1
(45) Date of Patent: Oct. 14, 2008

(54) DISK DRIVE ADJUSTING OPERATING MODE BASED ON HISTORICAL PROXIMITY OF HOST COMMANDS

(75) Inventor: Kenny T. Coker, Corona, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 351 days.

(21) Appl. No.: 11/111,411

(22) Filed: Apr. 20, 2005

(51) Int. Cl.
*G11B 19/02* (2006.01)
(52) U.S. Cl. .............................. 711/112; 360/69; 369/19
(58) Field of Classification Search ........................ None
See application file for complete search history.

(56) References Cited

U.S. PATENT DOCUMENTS

| | | | |
|---|---|---|---|
| 4,249,172 A * | 2/1981 | Watkins et al. ................ | 345/28 |
| 5,119,250 A | 6/1992 | Green et al. | |
| 5,146,578 A * | 9/1992 | Zangenehpour ............. | 711/137 |
| 5,182,684 A | 1/1993 | Thomas et al. | |
| 5,268,804 A | 12/1993 | Wallis | |
| 5,594,603 A | 1/1997 | Mori et al. | |
| 5,657,179 A | 8/1997 | McKenzie | |
| 5,793,558 A | 8/1998 | Codilian et al. | |
| 5,966,726 A * | 10/1999 | Sokolov ..................... | 711/113 |
| 6,038,096 A | 3/2000 | Zhang et al. | |
| 6,115,205 A | 9/2000 | Waugh et al. | |
| 6,163,430 A | 12/2000 | Hansen | |
| 6,195,222 B1 | 2/2001 | Heminger et al. | |
| 6,310,743 B1 | 10/2001 | Haines et al. | |
| 6,339,811 B1 | 1/2002 | Gaertner et al. | |
| 6,342,985 B1 | 1/2002 | Clare et al. | |
| 6,369,972 B1 | 4/2002 | Codilian et al. | |
| 6,418,510 B1 | 7/2002 | Lamberts | |
| 6,445,531 B1 | 9/2002 | Gaertner et al. | |
| 6,604,178 B1 | 8/2003 | Hall | |
| 6,731,450 B1 | 5/2004 | Codilian et al. | |
| 6,744,590 B2 | 6/2004 | Chu et al. | |
| 6,754,035 B2 | 6/2004 | Francis et al. | |
| 6,754,036 B2 | 6/2004 | Dehnert | |
| 6,757,481 B1 | 6/2004 | Nazarian et al. | |
| 6,775,100 B1 | 8/2004 | Belser et al. | |
| 6,809,896 B2 | 10/2004 | Espeseth et al. | |
| 6,826,630 B2 | 11/2004 | Olds et al. | |
| 6,877,070 B2 | 4/2005 | Espeseth et al. | |
| 6,925,539 B2 | 8/2005 | Mowery et al. | |

(Continued)

OTHER PUBLICATIONS

"Optimal Seek-Speed versus Power Tradeoff in Disk File Systems", IBM Technical Disclosure Bulletin, Jun. 1995, vol. #38, Pub #6, pp. 323-324.

*Primary Examiner*—B. James Peikari
(74) *Attorney, Agent, or Firm*—Howard H. Sheerin, Esq.

(57) ABSTRACT

A disk drive is disclosed comprising a disk, a head actuated over the disk, and a history array for storing a plurality of history records, wherein each history record having a history range identifying a range of sector addresses proximate the sector address of a host command. As new host commands are received, the sector address of each host command is compared to the history records in the history array. A counter is adjusted in response to each comparison, and an operating mode of the disk drive is configured into a new operating mode if the counter exceeds a threshold, wherein the configuring includes adjusting at least one of the history range and the threshold relative to the new operating mode.

26 Claims, 8 Drawing Sheets

U.S. PATENT DOCUMENTS

| | | |
|---|---|---|
| 6,967,811 B1 | 11/2005 | Codilian et al. |
| 6,968,423 B2 | 11/2005 | Coker et al. |
| 6,987,639 B1 | 1/2006 | Yu |
| 6,995,946 B2 | 2/2006 | Ding et al. |
| 7,061,714 B1 | 6/2006 | Yu |
| 7,076,604 B1 * | 7/2006 | Thelin .................. 711/112 |
| 2002/0131195 A1 | 9/2002 | Dehnert |
| 2003/0048571 A1 | 3/2003 | Soyama et al. |
| 2003/0149837 A1 | 8/2003 | Coker et al. |
| 2003/0149838 A1 | 8/2003 | Mowery et al. |
| 2004/0233569 A1 | 11/2004 | Chung |
| 2005/0086559 A1 * | 4/2005 | Uysal et al. ................ 714/6 |
| 2006/0007591 A1 | 1/2006 | Park et al. |

* cited by examiner

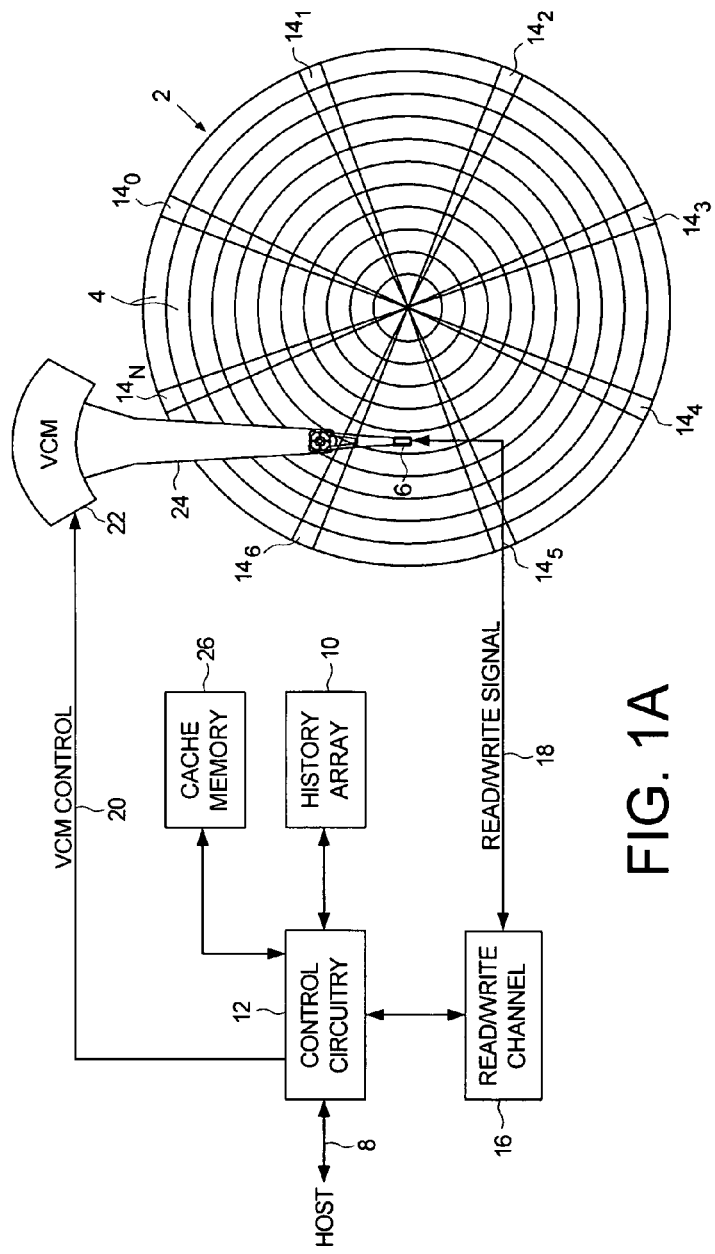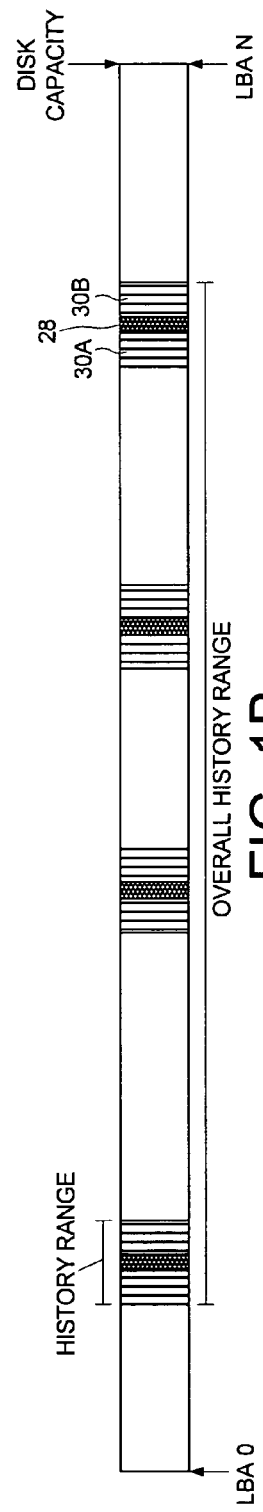
FIG. 1A
FIG. 1B

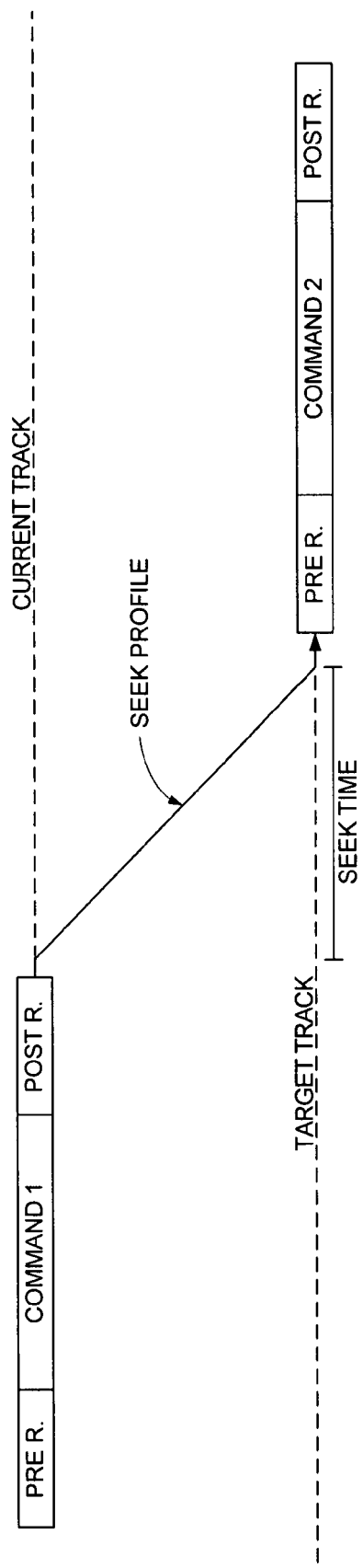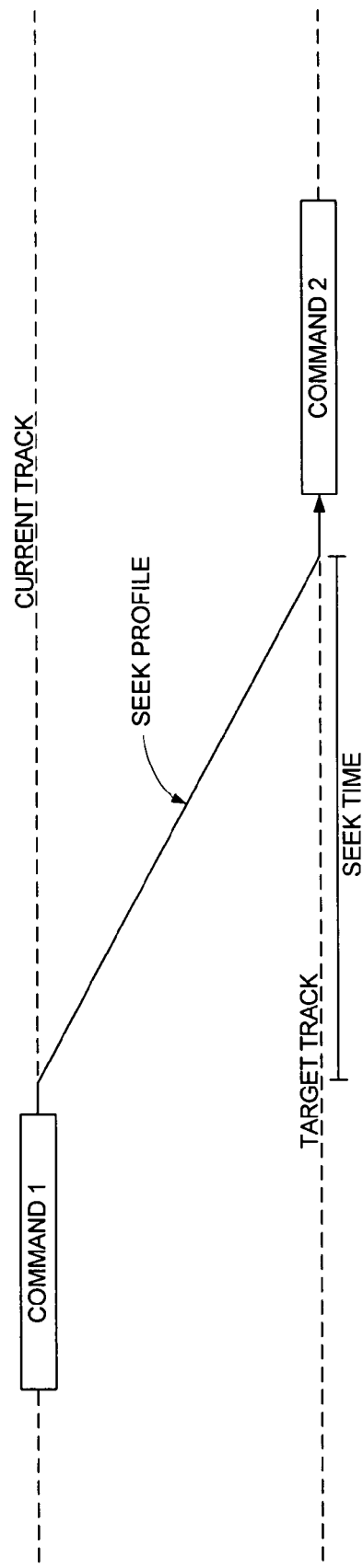

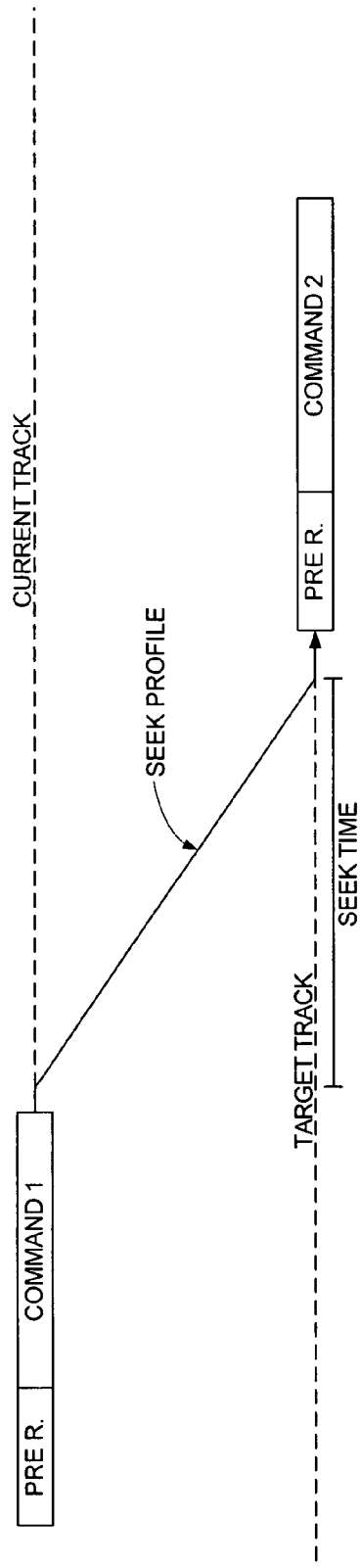
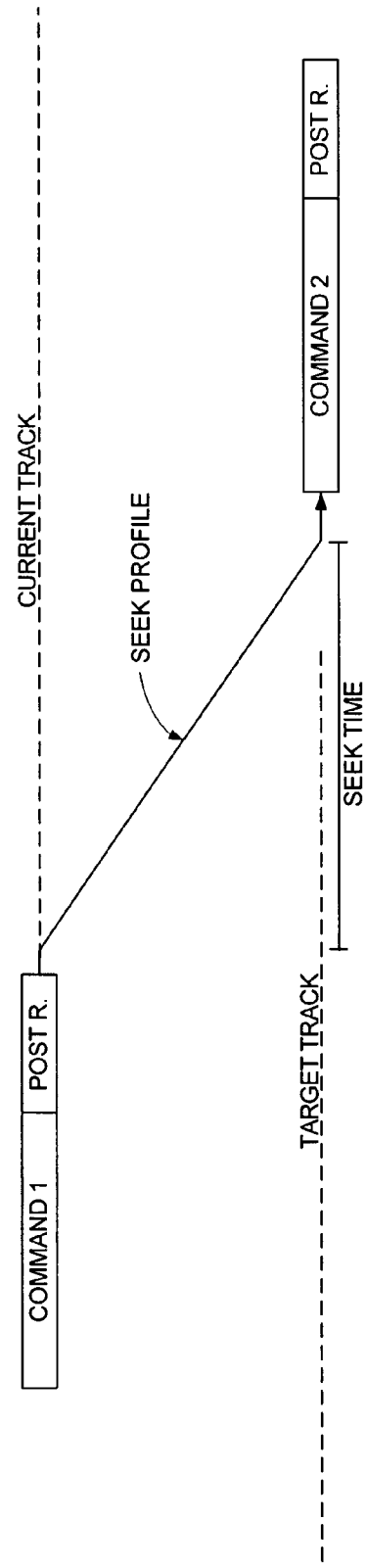

| MODE | HISTORY WINDOW | HISTORY RANGE | HIT COUNT THRESH. | MISS COUNT THRESH. |
|---|---|---|---|---|
| RANDOM | 64 | 512 | 7 | N/A |
| PROXIMITY | 32 | 256 | N/A | 16 |

FIG. 8A

| MODE | HISTORY WINDOW | HISTORY RANGE | HIT COUNT THRESH. | MISS COUNT THRESH. |
|---|---|---|---|---|
| SEQUENTIAL | 32 | 128 | 32 | 1 |
| MULTI-SEQUENTIAL | 32 | 128 | 10 | 1 |
| NEAR-SEQUENTIAL | 32 | 256 | 24 | 8 |

FIG. 8B

DISK DRIVE ADJUSTING OPERATING MODE BASED ON HISTORICAL PROXIMITY OF HOST COMMANDS

BACKGROUND OF THE INVENTION

1. Field of the Invention

The present invention relates to disk drives for computer systems. More particularly, the present invention relates to a disk drive adjusting operating mode based on historical proximity of host commands.

2. Description of the Prior Art

Disk drives comprise one or more disks having a plurality of tracks which are partitioned into a number of data sectors. A head coupled to a distal end of an actuator arm is actuated over the disk to access a target data sector by rotating the actuator arm about a pivot in a seek operation. The disk drive typically employs a voice coil motor (VCM) for rotating the actuator arm about the pivot by energizing the voice coil with current. The ability of the VCM to follow a predetermined seek profile depends on the acceleration/deceleration capability of the VCM as controlled by the magnitude of current energizing the voice coil. Aggressive seek profiles require aggressive acceleration/deceleration currents which increases the heat and mechanical stress on the VCM, as well as increases power dissipation.

Disk drives are typically accessed in one of a number of modes, such as random access mode and proximity access mode. Random access mode occurs when the host is executing an application that accesses data in a substantially random manner, meaning the data may be recorded at random locations about the disk requiring numerous random length seeks. Proximity access mode occurs when the host is executing an application that accesses data recorded in close proximity on the disk, such as data accessed in a substantially sequential or near-sequential manner (e.g., when accessing a data-base or a video stream). When operating in a proximity access mode, performance is enhanced through predictive caching wherein a predetermined number of additional data sectors preceding and/or following the target data sectors are also read from the disk and stored in a cache memory in anticipation that these data sectors may also be requested by the host. If so, the access time of the disk drive is reduced significantly since the access time of the cache memory is much faster than the access time of the disk due to the mechanical latency in seeking the head and rotating the disk.

Certain performance benefits are attained by configuring the disk drive relative to the access mode. For example, if the disk drive is operating in a random access mode, it may be desirable to disable predictive caching to allow less aggressive seek profiles, thereby reducing VCM heating and power dissipation. There is, therefore, a need to detect the access mode of a disk drive so that it can be configured to improve operating performance.

SUMMARY OF THE INVENTION

The present invention may be regarded as a disk drive comprising a disk having a plurality of data tracks, wherein each data track comprises a plurality of data sectors. The disk drive further comprises a head actuated over the disk, and an interface for receiving host commands from a host, each host command comprising a sector address for accessing one or more of the data sectors. A history array stores a plurality of history records, wherein each history record having a history range identifying a range of sector addresses proximate the sector address of one of the host commands. As a plurality of host commands are received from the host, the sector address of each host command is compared to the history records in the history array. A counter is adjusted in response to the comparison, and an operating mode of the disk drive is configured into a new operating mode if the counter exceeds a first threshold, wherein the configuring includes adjusting at least one of the history range and the first threshold relative to the new operating mode.

In one embodiment, the disk drive comprises a cache memory for caching a predetermined range of additional data sectors for each host command. In one embodiment, the predetermined range of additional data sectors include a predetermined number of data sectors preceding the data sectors identified by each host command, and in another embodiment, the predetermined range of additional data sectors include a predetermined number of data sectors following the data sectors identified by each host command. In another embodiment, the operating mode of the disk drive comprises one of a plurality of access modes selected from the group consisting of a random access mode and a proximity access mode. The caching of additional data sectors while in the random access mode is disabled, and the caching of additional data sectors while in the proximity access mode is enabled.

In yet another embodiment, the operating mode of the disk drive comprises one of a plurality of seek modes for seeking the head from a current track to a target track, wherein each seek mode comprises one of a plurality of seek profiles. In one embodiment, while in the random access mode the head seeks from a current track to a target track according to a first seek profile resulting a first seek time, and while in the proximity access mode the head seeks from a current track to a target track using a second seek profile resulting in a second seek time less than the first seek time.

In still another embodiment, the counter is reset if the number of host commands received exceeds a second threshold before the counter exceeds the first threshold. In one embodiment, the second threshold is adjusted relative to the new operating mode.

In another embodiment, the history range is decreased when the operating mode changes from the random access mode to the proximity access mode.

In another embodiment, the first threshold is increased when the operating mode changes from the random access mode to the proximity access mode.

In another embodiment, the second threshold is decreased when the operating mode changes from the random access mode to the proximity access mode.

In yet another embodiment, the counter is adjusted in response to both read and write host commands received from the host.

The present invention may also be regarded as a method of operating a disk drive, the disk drive comprising a plurality of data tracks, wherein each data track comprises a plurality of data sectors. The disk drive further comprises a head actuated over the disk, and an interface for receiving host commands from a host, wherein each host command comprising a sector address for accessing one or more of the data sectors. A history array stores a plurality of history records, wherein each history record having a history range identifying a range of sector addresses proximate the sector address of one of the host commands. As a plurality of host commands are received from the host, the sector address of each host command is compared to the history records in the history array. A counter is adjusted in response to the comparison, and an operating mode of the disk drive is configured into a new operating mode if the counter exceeds a first threshold, wherein the configuring includes adjusting at least one of the history range and the first threshold relative to the new operating mode.

BRIEF DESCRIPTION OF THE DRAWINGS

FIG. 1A shows a disk drive according to an embodiment of the present invention comprising a history array for storing a plurality of history records each having a history range, wherein an operating mode of the disk drive is adjusted by comparing the sector address of host commands to the history records.

FIG. 1B illustrates the capacity of a disk drive and a state of the history array comprising four history records.

FIGS. 5A-5B illustrate an embodiment of the present invention wherein the disk drive is configured into the new operating mode by using a less aggressive seek profile while operating in a random access mode wherein caching of predictive data is disabled.

FIGS. 7A-7B illustrate how in one embodiment the seek profile is adjusted relative to whether the disk drive is caching pre or post data sectors.

FIG. 8A is a table illustrating how the history window, history range, and thresholds are adjusted relative to the access mode (random or proximity).

FIG. 8B is a table illustrating an embodiment of the present invention wherein the disk drive further operates according to sub-proximity access modes, including a sequential, multi-sequential, and near-sequential access modes.

DESCRIPTION OF THE PREFERRED EMBODIMENTS

Figure 2:
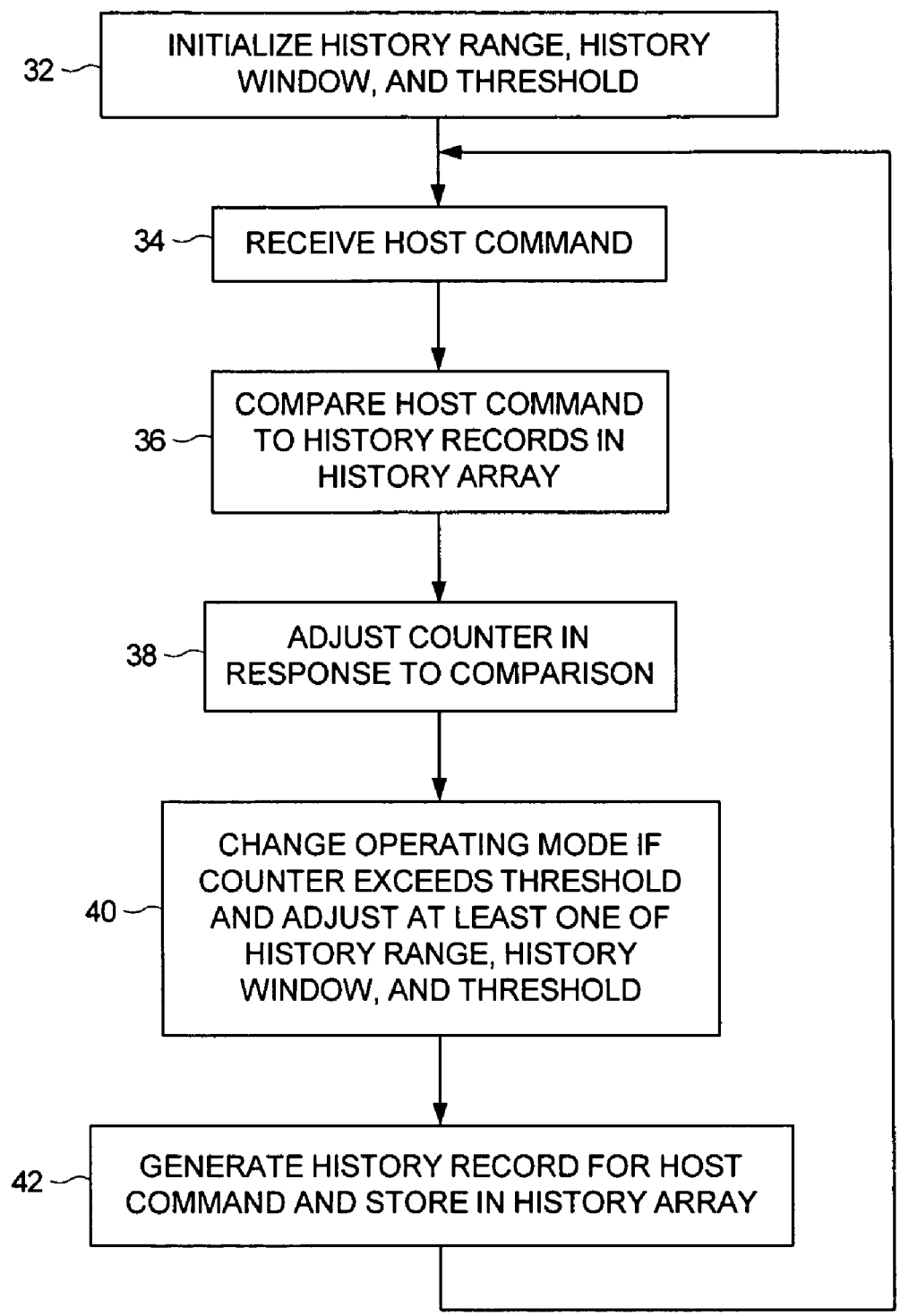
FIG. 2 is a flow diagram according to an embodiment of the present invention wherein at least one of the history range, history window, and thresholds are adjusted relative to the new operating mode.

FIG. 1A shows a disk drive according to an embodiment of the present invention comprising a disk 2 having a plurality of data tracks 4, wherein each data track 4 comprises a plurality of data sectors. The disk drive further comprises a head 6 actuated over the disk 2, and an interface 8 for receiving host commands from a host, each host command comprising a sector address for accessing one or more of the data sectors. A history array 10 stores a plurality of history records, wherein each history record having a history range (FIG. 1B) identifying a range of sector addresses proximate the sector address of one of the host commands. As control circuitry 12 receives a plurality of new host commands from the host, the control circuitry 12 compares the sector address of each host command to the history records in the history array 10. The control circuitry 12 adjusts a counter in response to the comparison, and configures an operating mode of the disk drive into a new operating mode if the counter exceeds a first threshold, wherein the configuring includes adjusting at least one of the history range and the first threshold relative to the new operating mode.

In the embodiment of FIG. 1A, a plurality of embedded servo sectors $14_0$-$14_N$ is written to the disk 2 to facilitate positioning the head 6 over a target data track. As the head 6 passes over a servo sector 14, a read/write channel 16 processes the read signal 18 to demodulate the servo data (e.g., track address and servo bursts) to derive a radial location of the head 6. The control circuitry 12 compares the actual position of the head 6 to a target position to generate a position error signal (PES) and corresponding control signal 20 applied to a voice coil motor (VCM) 22. In response to the control signal 20, the VCM 22 rotates an actuator arm 24 about a pivot in order to actuate the head 6 radially over the disk 2 until the head 6 is positioned over the target radial location. The disk drive in FIG. 1A also comprises a cache memory 26 for caching write data received from the host to facilitate deferred write operations as well as caching additional data sectors during read operations to reduce the access time inherent in the mechanical latency of rotating the disk 2 and actuating the head 6.

FIG. 1B illustrates the capacity of the disk 2 and the state of the history array 10 comprising four history records. In one embodiment, the data sectors on the disk 2 are addressed by the host using a logical block addressing (LBA) scheme, wherein each LBA is mapped to a physical data sector on the disk 2 to facilitate mapping defective data sectors to spare data sectors. In FIG. 1B, the capacity of the disk is represented as LBA 0 on the left, LBA N on the right, and the four history records (host commands) distributed about the overall range. Each history record comprises the LBA address range of the host command 28 (read or write), and a predetermined history range that identifies a predetermined number of data sectors 30A preceding the host command 28 and a predetermined number of data sectors 30B following the host command 28. In one embodiment, the history range corresponds to the number of data sectors cached in the cache memory 26 for a read operation, and in alternative embodiment, the history range is different than the cache range. In either case, the history range is used to detect when the disk drive changes operating modes relative to the proximity of the LBAs in recent host commands. In one embodiment, the disk drive comprises a plurality of access modes, including a random access mode and a proximity access mode depending on whether the LBAs of the host commands are distributed randomly or located in close proximity. The disk drive is configured to improve performance based on the access mode, such as disabling the predictive caching and modifying the seek profile to reduce VCM heating and power dissipation while in the random access mode.

FIG. 2 shows a flow diagram according to an embodiment of the present invention for configuring the disk drive relative to the access mode. At step 32 the control circuitry 12 initializes the history range, a history window, and a threshold. The history window represents a number of host commands that are evaluated to determine whether the disk drive should change into a new operating mode, and the threshold determines when the disk drive changes into a new operating mode. At step 34 a host command is received from the host, and at step 36 the sector address (LBA) of the host command is compared to the history records in the history array 10. At step 38 a counter is adjusted in response to the comparison, and at step 40 the operating mode is changed if the counter exceeds the threshold. In connection with changing the operating mode, at least one of the history range, history window, and threshold is adjusted, thereby changing the criteria required to exit the current operating mode. For example, performance decreases significantly if the disk drive is in the random access mode when the host commands are in proximity. Therefore, once the disk drive enters the proximity access mode, the threshold is increased to maintain the disk drive in the proximity access mode until it is clear the host commands are random. After adjusting the operating mode of the disk drive, at step 42 a history record is generated for the current host command (received at step 34) and the history record is stored in the history array 10.

Figure 3:
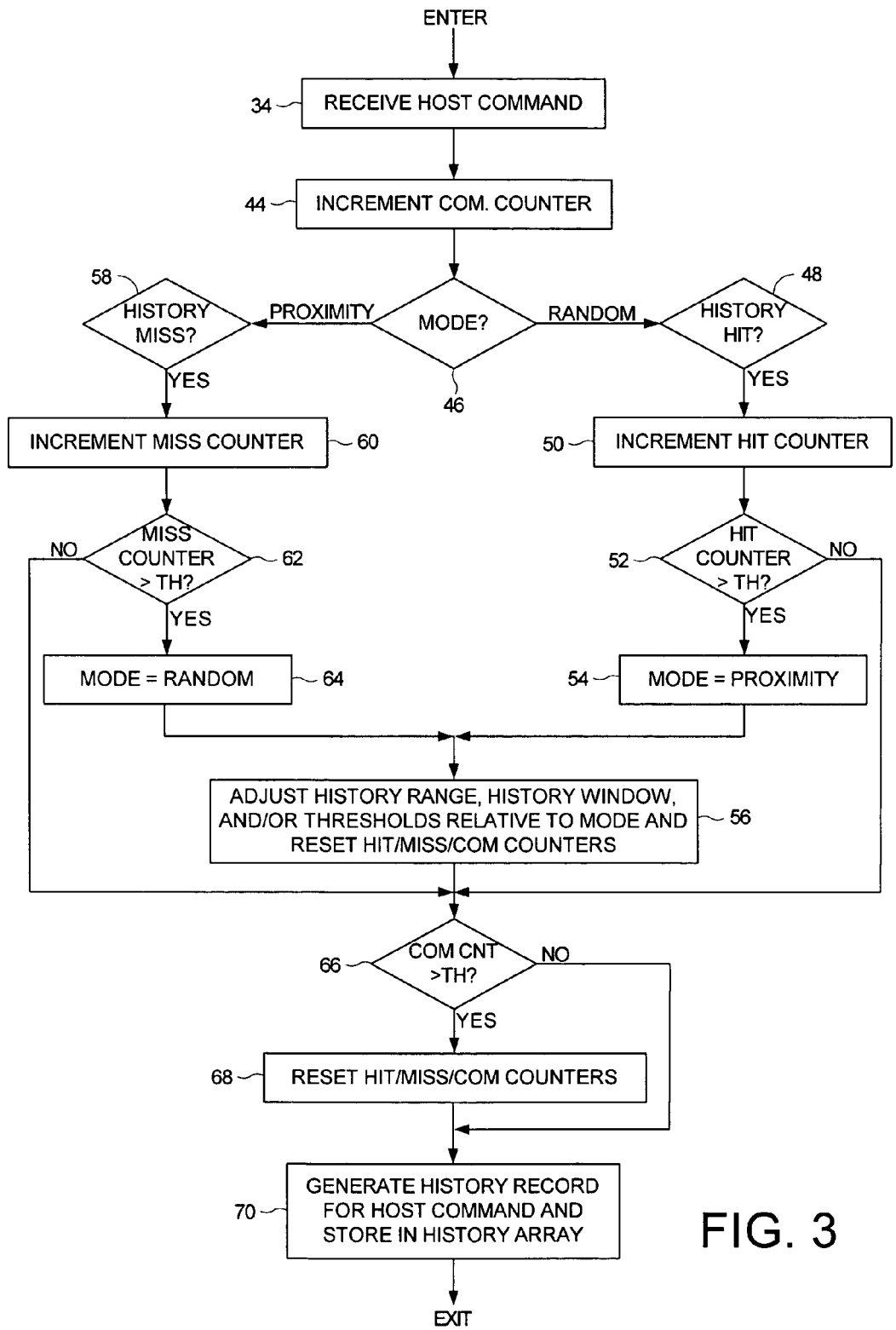
FIG. 3 is a flow diagram according to a more detailed embodiment of the present invention, wherein a miss counter tracks when the host commands miss (fall outside) of the history range of the history records, and a hit counter tracks when the host commands hit (fall inside) the history range of the history records.

FIG. 3 shows a more detailed flow diagram according to an embodiment of the present invention, wherein the control circuitry 12 maintains a "hit counter" and a "miss counter" corresponding to whether the sector address of a current host command falls within the history range of one of the history records (hit) or whether it misses the history range of all the history records. In this embodiment, a host command counter is incremented at step 44 to track the number of host commands received over the history window, wherein the counters (command, hit, and miss) are reset after the command counter reaches a predetermined threshold. Thus in this embodiment, if the disk drive has not changed operating mode after receiving a predetermined number of host commands, the system is reset. In an alternative embodiment, the threshold counters (hit and miss) track a moving average which effectively acts as a low-pass filter (slowing the transition between operating modes).

Referring again to the flow diagram of FIG. 3, if at step 46 the current operating mode is random access, and at step 48 the sector address (LBA) of the host command falls within the history range of a history record in the history array 10, then at step 50 the hit counter is incremented. If at step 52 the hit counter exceeds a predetermined threshold, then at step 54 the operating mode of the disk drive is changed to the proximity access mode, and at step 56 at least one of the history range, history window, and/or thresholds are adjusted to appropriate values corresponding to the proximity access mode. The counters (command, hit, and miss) are also reset at step 56 to begin tracking new host commands to determine when the disk drive should be reconfigured back into the random access mode. That is, if the sector address of new host commands does not fall within the history range of any of the history record in the history array 10 at step 58, then at step 60 the miss counter is incremented at step 60. If at step 62 the miss counter exceeds a predetermined threshold, then at step 64 the operating mode of the disk drive is changed back to the random access mode, and at step 56 at least one of the history range, history window, and/or thresholds are adjusted to appropriate values corresponding to the random access mode. The counters (command, hit, and miss) are also reset at step 56 to begin tracking new host commands to determine when the disk drive should be reconfigured back into the proximity access mode. If at step 66 the command counter exceeds a predetermined threshold, the counters (command, hit, and miss) are reset at step 68, thereby resetting the history window. At step 70, a new history record is generated for the host command received at step 34, and the history record is stored in the history array 10.

Figure 4A:
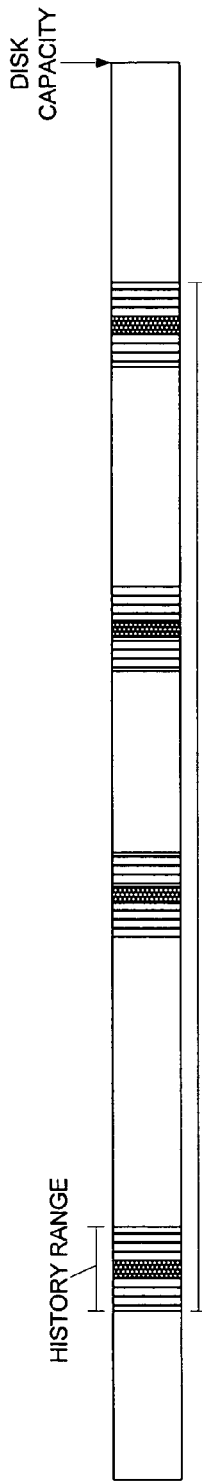
FIGS. 4A-4D illustrate a progression of the history records as new host commands are received as well as when a historical miss and a historical hit occurs.
Figure 4B:
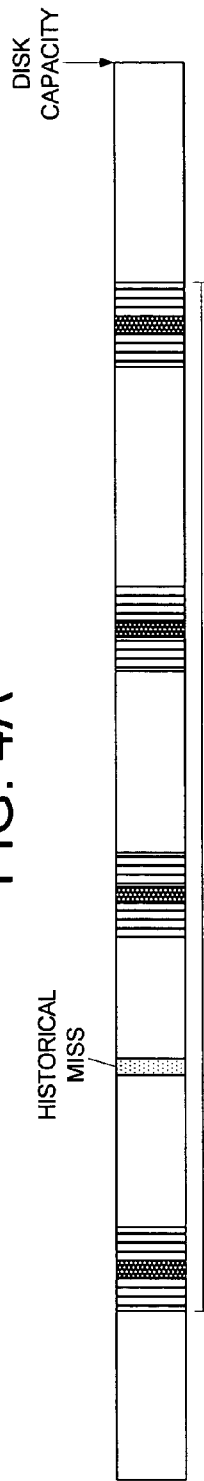
Figure 4C:
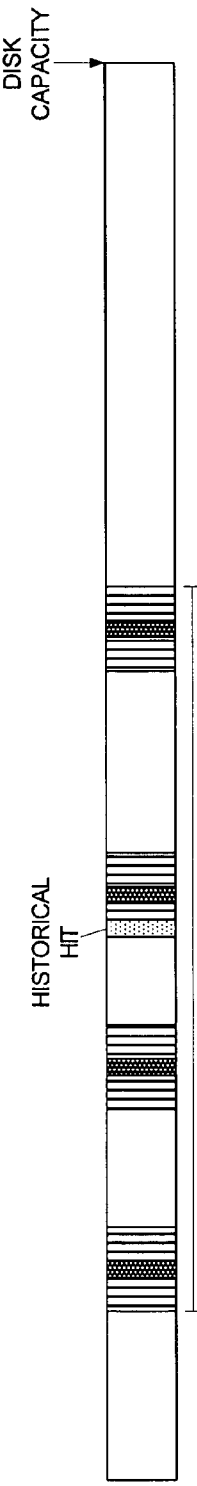
Figure 4D:

FIGS. 4A-4B illustrate how the disk drive progresses while in the random access mode toward the proximity access mode as reflected by the history records in the history array 10. In FIG. 4A, the history records reflect a random pattern of four host commands (any suitable number of host commands may be considered). In FIG. 4B a new host command is received which misses the history records such that the hit counter is not incremented at step 50 of FIG. 3. A new history record is created for the new host command which replaces the oldest history record in the history array 10 as shown in FIG. 4C. The history records in FIG. 4C begin forming a pattern of proximity, the sector address of the next host command falls in the history range of a history record, and the hit counter is incremented. If the history records become sufficiently proximate, the hit counter will exceed the threshold (at step 52 of FIG. 3) and the disk drive will transition into the proximity access mode.

When the disk drive transitions into a new operating mode, any suitable operating aspect may be reconfigured to improve operating performance. For example, the predictive caching of data sectors preceding and following a read command may be enabled while in the proximity access mode since the performance gains in achieving cache hits significantly outweighs the overhead required to execute the cache management policies. In addition, while in the proximity access mode the length and frequency of seeks is typically small (e.g., stepping from track to track) allowing an aggressive seek profile without excessive VCM heating or power dissipation. If the host commands become random, the predictive caching may be disabled and the seek profile relaxed to accommodate the typically longer seeks while in the random access mode. This embodiment is illustrated in FIGS. 5A-5B wherein in FIG. 5A the disk drive is in the proximity access mode with predictive caching enabled such that a number of data sectors preceding (PRE R.) a read command and following (POST R.) the read command are read and stored in the cache memory 26. When the disk drive seeks from the current track of a first read command (COMMAND 1) to a target track of a second read command (COMMAND 2), an aggressive seek profile is employed to facilitate reading the data sectors following the first read command and the data sectors preceding the second read command. As shown in FIG. 5B, when the disk drive transitions into the random access mode the predictive caching is disabled allowing a less aggressive seek profile since the additional data sectors (following and preceding data sectors) are not read, thereby improving performance by decreasing VCM heating and power dissipation.

Figure 6:
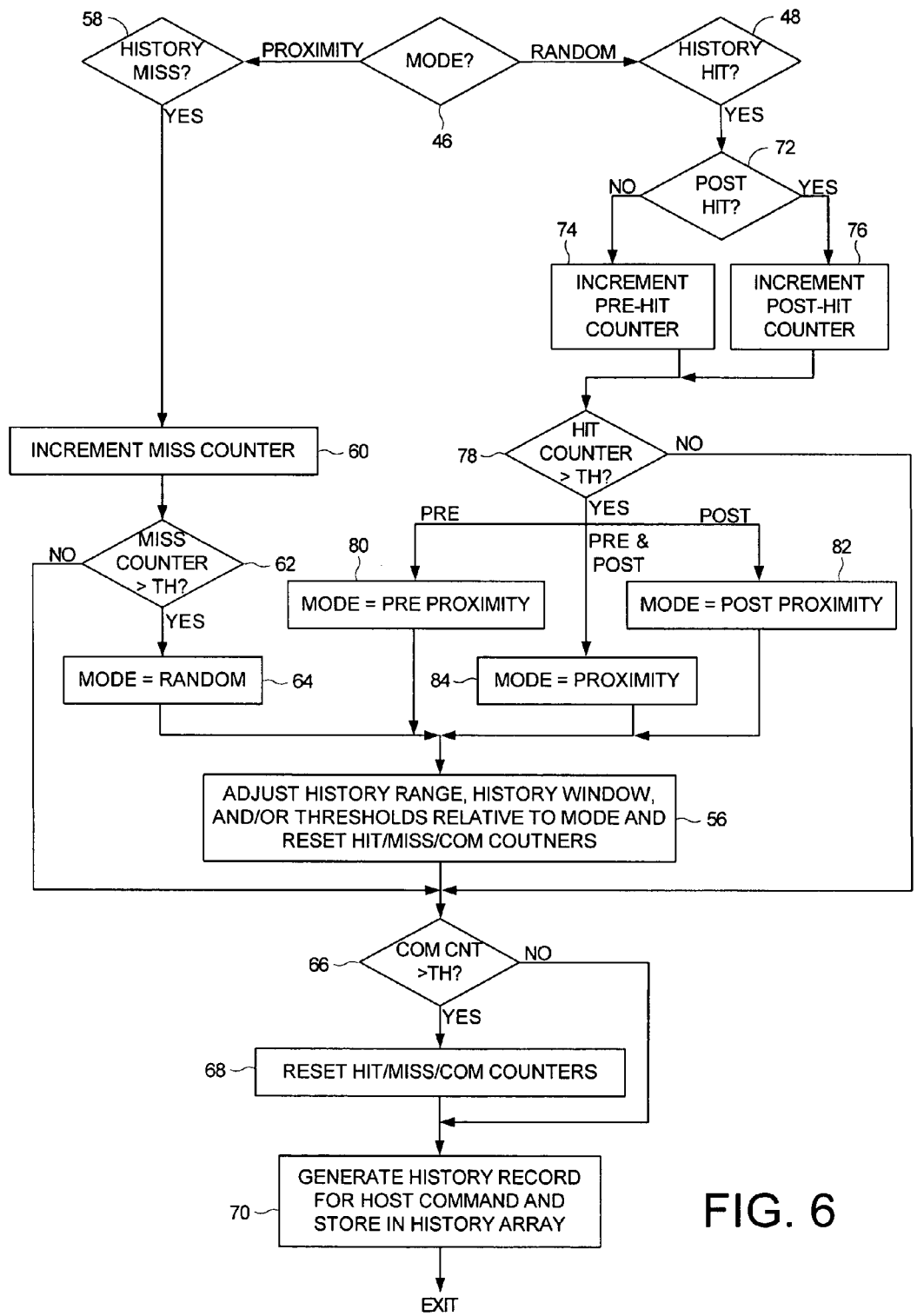
FIG. 6 is a flow diagram according to an embodiment of the present invention wherein the disk drive is configured to cache "pre" data sectors (preceding a host command) and/or "post" data sectors (following a host command) depending on the frequency of hits in the pre and post area of the history range.

FIG. 6 is a flow diagram according to an embodiment of the present invention wherein the disk drive is configured into a normal proximity access mode wherein pre and post data sectors are cached, a pre-only access mode wherein only pre data sectors are cached, and a post-only access mode wherein only post data sectors are cached. This embodiment may improve operating performance, for example, by allowing a less aggressive seek profile or by increasing the likelihood of cache hits. For example, if the host is requesting data in a sequential or near sequential mode, the operating performance (in terms of cache hits) may be improved by reducing or eliminating the number of pre data sectors cached and increasing the number of post data sectors cached. The flow diagram of FIG. 6 extends the flow diagram of FIG. 4 wherein if at step 48 there is a history hit, then at step 72 a branch is taken based on whether the history hit occurred in the history range preceding a previous host command or in the history range following a previous host command. Corresponding counters are then incremented at steps 74 or 76, and at step 78 the counters are compared to the threshold. If the pre-hit counter exceeds the threshold, the access mode is changed to PRE PROXIMITY at step 80, if the post-hit counter exceeds the threshold, the access mode is changed to POST PROXIMITY at step 82, and if both counters exceed the threshold, the access mode is changed to PROXIMITY at step 84. FIG. 7A illustrates the PRE PROXIMITY access mode wherein only data sectors preceding the read commands are read and cached in the cache memory 26, and FIG. 7B illustrates the POST PROXIMITY access mode wherein only data sectors following the read commands are read and cached in the cache memory 26.

FIG. 8A is a table illustrating how the history window, history range, and thresholds are adjusted when the disk drive transitions between the random access mode and the proximity access mode. When the disk drive is in random access mode, the history window is set to 64 consecutive host commands (before resetting the counters), the history range is set to 512 data sectors preceding and following the sector address of each host command of each history record, and the hit count threshold (to transition into the proximity access mode) is set to 7. That is, the disk drive will transition into the proximity access mode if the hit counter exceeds 7 before the command counter reaches 64. When the disk drive is in the proximity access mode, the history window is reduced to 32 consecutive host commands (before resetting the counters), the history range is reduced to 256 data sectors preceding and following the sector address of each host command of each history record, and the miss count threshold (to transition back into the random access mode) is increased to 16. That is, the disk drive will transition back into the random access mode if the miss counter exceeds 16 before the command counter reaches 32. Decreasing the history window and history range, and increasing the threshold helps ensure the disk drive will remain in the proximity access mode once entered (i.e., hysteresis), thereby ensuring the performance benefit derived from operating in that mode (predictive caching). In other words, once a proximity access mode is detected the disk drive is configured so that it less likely to transition back into the random access mode unless it is truly receiving random host commands.

In another embodiment illustrated in the table of FIG. 8B, the disk drive operates in a number of sub-proximity access modes, including a sequential access mode, a multi-sequential access mode, and a near-sequential access mode. The sequential access mode indicates the host commands are purely sequential (either forward or reverse), the multi-sequential access mode indicates the host commands are accessing multiple streams, and the near-sequential access mode indicates the host commands are forward sequential with periodic gaps. Each of these modes have a corresponding history window, history range, and thresholds (hit and miss). For example, if while the disk drive is in the proximity access mode the hit counter exceeds 32, the disk drive will transition into the sequential access mode. If while in the sequential access mode the miss counter exceeds 1, the disk drive will transition back into the proximity access mode.

Any suitable parameters may be configured to help optimize performance while in the individual modes of operation. For example, while in the sequential access mode, the disk drive may allocate a circular buffer in the cache memory 26 to facilitate accessing a stream (read or write). While in the multi-sequential access mode, the disk drive may allocate multiple linear buffers corresponding to each stream being accessed and swap between the linear buffers in order to minimize the number of seeks. While in the near-sequential access mode, the disk drive may reduce or eliminate the predictive caching for data sectors preceding a read command and either increase the predictive caching for the data sectors following a read command (post-read), decrease the seek profile to reduce VCM heating and power dissipation, or configure both the post-reads and seek profile to optimize overall performance.

I claim:

1. A disk drive comprising:
   (a) a disk comprising a plurality of data tracks, wherein each data track comprises a plurality of data sectors;
   (b) a head actuated over the disk;
   (c) an interface for receiving host commands from a host, each host command comprising a sector address for accessing one or more of the data sectors;
   (d) a history array for storing a plurality of history records, each history record having a history range identifying a range of sector addresses proximate the sector address of one of the host commands; and
   (e) control circuitry for:
       receiving a plurality of host commands from the host;
       comparing the sector address of each host command to the history records in the history array;
       adjusting a counter in response to each comparison; and
       configuring an operating mode of the disk drive into a new operating mode if the counter exceeds a first threshold, wherein the configuring includes adjusting at least one of the history range and the first threshold relative to the new operating mode.

2. The disk drive as recited in claim 1, further comprising a cache memory for caching a predetermined range of additional data sectors for each host command.

3. The disk drive as recited in claim 2, wherein the predetermined range of additional data sectors include a predetermined number of data sectors preceding the data sectors identified by each host command.

4. The disk drive as recited in claim 2, wherein the predetermined range of additional data sectors include a predetermined number of data sectors following the data sectors identified by each host command.

5. The disk drive as recited in claim 2, wherein the operating mode of the disk drive comprises one of a plurality of access modes selected from the group consisting of a random access mode and a proximity access mode, wherein:
   (a) the control circuitry disables the caching of additional data sectors while in the random access mode; and
   (b) the control circuitry enables the caching of additional data sectors while in the proximity access mode.

6. The disk drive as recited in claim 5, wherein:
   (a) while in the random access mode, the control circuitry seeks the head from a current track to a target track according to a first seek profile resulting a first seek time; and
   (b) while in the proximity access mode, the control circuitry seeks the head from a current track to a target track using a second seek profile resulting in a second seek time less than the first seek time.

7. The disk drive as recited in claim 1, wherein the operating mode of the disk drive comprises one of a plurality of seek modes for seeking the head from a current track to a target track, wherein each seek mode comprises one of a plurality of seek profiles.

8. The disk drive as recited in claim 1, wherein the control circuitry resets the counter if the number of host commands received exceeds a second threshold before the counter exceeds the first threshold.

9. The disk drive as recited in claim 8, wherein the control circuitry adjusts the second threshold relative to the new operating mode.

10. The disk drive as recited in claim 9, wherein the operating mode of the disk drive comprises one of a plurality of access modes selected from the group consisting of a random access mode and a proximity access mode, wherein the control circuitry decreases the second threshold when the operating mode changes from the random access mode to the proximity access mode.

11. The disk drive as recited in claim 1, wherein the operating mode of the disk drive comprises one of a plurality of access modes selected from the group consisting of a random access mode and a proximity access mode, wherein the control circuitry decreases the history range when the operating mode changes from the random access mode to the proximity access mode.

12. The disk drive as recited in claim 1, wherein the operating mode of the disk drive comprises one of a plurality of access modes selected from the group consisting of a random access mode and a proximity access mode, wherein the control circuitry increases the first threshold when the operating mode changes from the random access mode to the proximity access mode.

13. The disk drive as recited in claim 1, wherein the control circuitry adjusts the counter in response to both read and write host commands received from the host.

14. A method of operating a disk drive, the disk drive comprising a disk comprising a plurality of data tracks, wherein each data track comprises a plurality of data sectors, a head actuated over the disk, an interface for receiving host commands from a host, each host command comprising a sector address for accessing one or more of the data sectors, and a history array for storing a plurality of history records, each history record having a history range identifying a range of sector addresses proximate the sector address of one of the host commands, the method comprising the steps of:
   (a) receiving a plurality of host commands from the host;
   (b) comparing the sector address of each host command to the history records in the history array;
   (c) adjusting a counter in response to each comparison; and
   (d) configuring an operating mode of the disk drive into a new operating mode if the counter exceeds a first threshold, wherein the configuring includes adjusting at least one of the history range and the first threshold relative to the new operating mode.

15. The method as recited in claim 14, wherein the disk drive further comprises a cache memory for caching a predetermined range of additional data sectors for each host command.

16. The method as recited in claim 15, wherein the predetermined range of additional data sectors include a predetermined number of data sectors preceding the data sectors identified by each host command.

17. The method as recited in claim 15, wherein the predetermined range of additional data sectors include a predetermined number of data sectors following the data sectors identified by each host command.

18. The method as recited in claim 15, wherein the operating mode of the disk drive comprises one of a plurality of access modes selected from the group consisting of a random access mode and a proximity access mode, further comprising the steps of:
   (a) disabling the caching of additional data sectors while in the random access mode; and
   (b) enabling the caching of additional data sectors while in the proximity access mode.

19. The method as recited in claim 14, wherein the operating mode of the disk drive comprises one of a plurality of seek modes for seeking the head from a current track to a target track, wherein each seek mode comprises one of a plurality of seek profiles.

20. The method as recited in claim 19, further comprising the steps of:
   (a) while in the random access mode, seeking the head from a current track to a target track according to a first seek profile resulting a first seek time; and
   (b) while in the proximity access mode, seeking the head from a current track to a target track using a second seek profile resulting in a second seek time less than the first seek time.

21. The method as recited in claim 14, further comprising the step of resetting the counter if the number of host commands received exceeds a second threshold before the counter exceeds the first threshold.

22. The method as recited in claim 21, further comprising the step of adjusting the second threshold relative to the new operating mode.

23. The method as recited in claim 22, wherein the operating mode of the disk drive comprises one of a plurality of access modes selected from the group consisting of a random access mode and a proximity access mode, further comprising the step of decreasing the second threshold when the operating mode changes from the random access mode to the proximity access mode.

24. The method as recited in claim 14, wherein the operating mode of the disk drive comprises one of a plurality of access modes selected from the group consisting of a random access mode and a proximity access mode, further comprising the step of decreasing the history range when the operating mode changes from the random access mode to the proximity access mode.

25. The method as recited in claim 14, wherein the operating mode of the disk drive comprises one of a plurality of access modes selected from the group consisting of a random access mode and a proximity access mode, further comprising the step of increasing the first threshold when the operating mode changes from the random access mode to the proximity access mode.

26. The method as recited in claim 14, further comprising the step of adjusting the counter in response to both read and write host commands received from the host.

* * * * *